(12) United States Patent
Grosskopf et al.

(10) Patent No.: US 8,316,880 B2
(45) Date of Patent: Nov. 27, 2012

(54) OIL FILTER BYPASS VALVE ASSEMBLY FOR A GENERATOR

(75) Inventors: Andrew P. Grosskopf, Rockford, IL (US); Glenn C. Lemmers, Jr., Loves Park, IL (US); Craig R. Legros, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 555 days.

(21) Appl. No.: 12/437,603

(22) Filed: May 8, 2009

(65) Prior Publication Data
US 2010/0283338 A1    Nov. 11, 2010

(51) Int. Cl.
*F16K 31/12* (2006.01)

(52) U.S. Cl. ........ 137/504; 137/529; 137/536; 137/538; 137/540; 251/344

(58) Field of Classification Search ............. 137/115.03, 137/494, 497, 504, 529, 536, 538, 540; 251/343–345
See application file for complete search history.

(56) References Cited

U.S. PATENT DOCUMENTS

| | | | | |
|---|---|---|---|---|
| 2,214,683 | A | * | 9/1940 | Spang .............................. 138/31 |
| 4,275,758 | A | * | 6/1981 | Masuda ........................ 137/489 |
| 4,453,514 | A | | 6/1984 | Martinsons et al. |
| 4,876,857 | A | * | 10/1989 | Feltz et al. ...................... 60/734 |
| 4,897,996 | A | | 2/1990 | Hagin et al. |
| 5,130,657 | A | | 7/1992 | Hornung |
| 5,168,895 | A | * | 12/1992 | Voss ............................... 137/494 |
| 5,692,370 | A | | 12/1997 | Stuhlmuller et al. |
| 6,221,242 | B1 | | 4/2001 | Deibel et al. |
| 6,289,919 | B1 | * | 9/2001 | Sledd et al. ............... 137/115.03 |
| 6,568,539 | B1 | | 5/2003 | Deibel et al. |
| 6,651,696 | B2 | * | 11/2003 | Hope et al. ..................... 137/540 |
| 7,063,100 | B2 | * | 6/2006 | Liberfarb ................. 137/115.08 |
| 7,208,854 | B1 | | 4/2007 | Saban et al. |
| 7,253,535 | B2 | | 8/2007 | Duesterhoeft |
| 7,262,537 | B2 | | 8/2007 | Worley et al. |
| 7,292,011 | B2 | | 11/2007 | Beneditz |
| 7,322,373 | B2 | * | 1/2008 | Lewis ....................... 137/516.29 |
| 7,416,392 | B2 | | 8/2008 | Russ |
| 7,448,220 | B2 | | 11/2008 | Schmidt et al. |

(Continued)

FOREIGN PATENT DOCUMENTS
EP    1475518 A2 *  11/2004

OTHER PUBLICATIONS

Machine Translation of EP 1475518 A2.*

(Continued)

*Primary Examiner* — Craig Schneider
*Assistant Examiner* — Jessica Cahill
(74) *Attorney, Agent, or Firm* — Carlson, Gaskey & Olds PC (57) ABSTRACT

A bypass valve assembly for a generator includes a spring cover with a flange which extends in a radial direction from a spring cover body. The spring cover body defines an overall length dimension, the overall length dimension to an end of the spring cover body to the flange dimension defines a ratio between 1.6:1-1.2:1. The bypass valve assembly also includes a valve sleeve with a multiple of windows. Each of the multiple of windows includes a longitudinal edge which defines a longitudinal edge radius and corner radius.

20 Claims, 7 Drawing Sheets

U.S. PATENT DOCUMENTS

| | | | |
|---|---|---|---|
| 2003/0140974 A1* | 7/2003 | Suilmann et al. | 137/625.26 |
| 2004/0021115 A1* | 2/2004 | Lemmonier et al. | 251/207 |
| 2004/0079912 A1* | 4/2004 | Moreno et al. | 251/129.02 |
| 2004/0173264 A1* | 9/2004 | Holder | 137/494 |
| 2005/0151107 A1* | 7/2005 | Shu | 251/214 |
| 2007/0272315 A1 | 11/2007 | Lewis | |

OTHER PUBLICATIONS

China Office Action dated Jun. 19, 2012 for Chinese Patent Application No. 201010173700.2.

* cited by examiner

OIL FILTER BYPASS VALVE ASSEMBLY FOR A GENERATOR

BACKGROUND

The present disclosure relates to a valve, and more particularly to a generator oil filter bypass valve.

Integrated Drive Generator (IDG) and Variable Frequency Generator (VFG) Systems typically incorporate a bypass valve that redirects oil in the event of a plugged filter to maintain sufficient oil flow to components. Current valves may be subjected to pressure pulsations that create cyclic loading. Such pulsations may reduce the service life of the bypass valve.

SUMMARY

A spring cover according to an exemplary aspect of the present disclosure includes a spring cover body having a flange which extends in a radial direction from the spring cover body. The spring cover body defines an overall length dimension and an end of spring cover body to flange dimension, the overall length dimension to the end of spring cover body to flange dimension defines a ratio between 1.6:1-1.2:1.

A valve sleeve according to an exemplary aspect of the present disclosure includes a valve sleeve body with a multiple of valve sleeve windows. Each of the multiple of valve sleeve windows includes a longitudinal edge which defines a longitudinal edge radius.

A bypass valve assembly for a generator according to an exemplary aspect of the present disclosure includes a spring cover with a flange which extends in a radial direction from a spring cover body. The spring cover body defines an overall length dimension, the overall length dimension to an end of the spring cover body to the flange dimension defines a ratio between 1.6:1-1.2:1. A valve sleeve adjacent to the spring cover. The valve sleeve defines a multiple of windows, each of the multiple of windows includes a longitudinal edge which defines a longitudinal edge radius.

A generator according to an exemplary aspect of the present disclosure includes a housing which defines an opening. A spring cover includes a flange which extends in a radial direction from a spring cover body. The spring cover body defines an overall length dimension which extends at least partially within the opening. The overall length dimension to an end of the valve cover body to the flange dimension defines a ratio between 1.6:1-1.2:1. A valve sleeve at least partially within the opening and adjacent to the spring cover. The valve sleeve defines a multiple of windows, each of the multiple of windows includes a longitudinal edge which defines a longitudinal edge radius.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
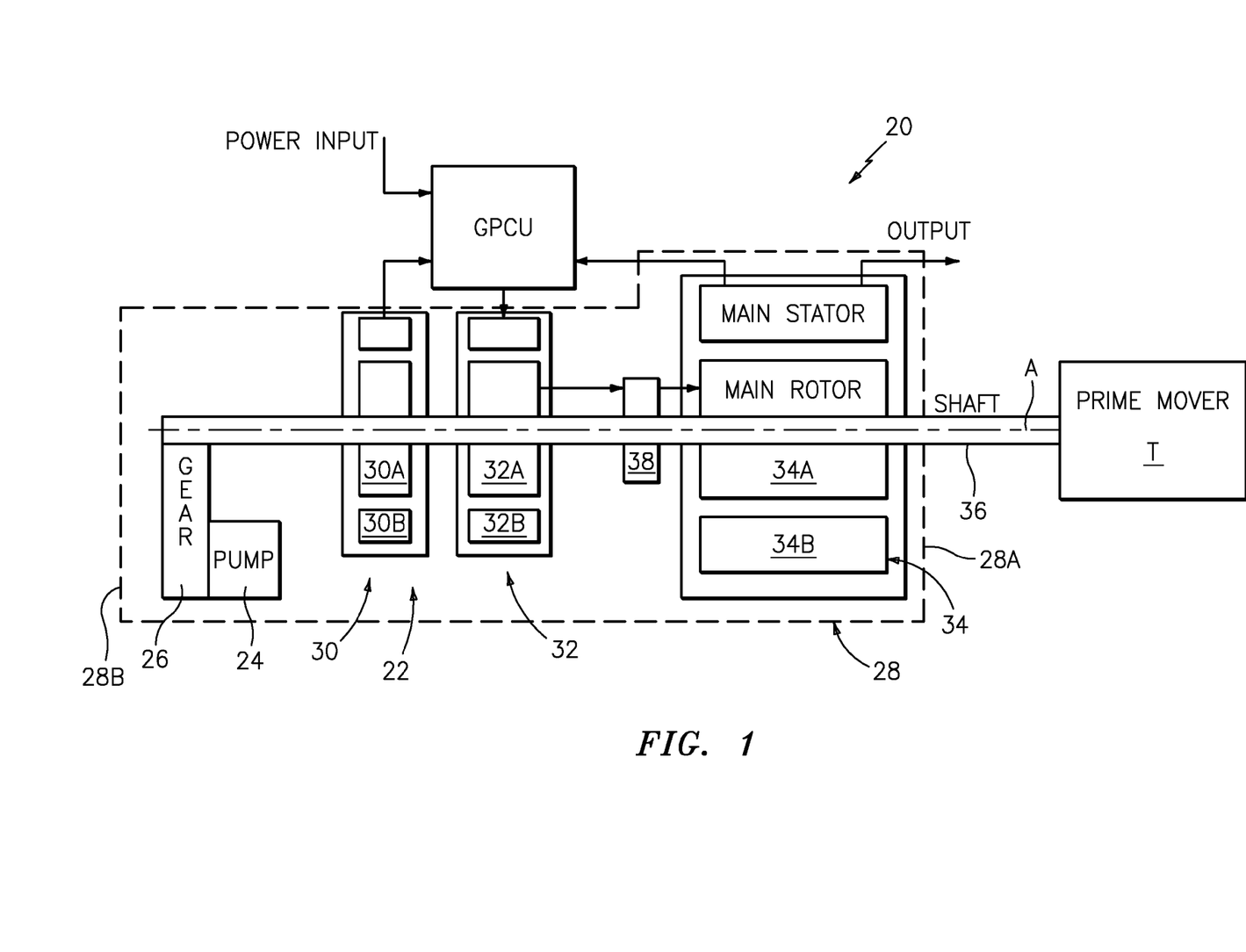
FIG. 1 is a general schematic sectional view of a starter-generator for a gas turbine engine.

FIG. 1 schematically illustrates selected portions of an example generator 20 driven by a prime mover T such as a gas turbine engine and for generating electrical current when being driven by the prime mover T. The generator 20 may generally include a dynamoelectric portion 22, a positive displacement pump 24 and a gearbox 26 all contained within a common housing assembly 28. Although a variable frequency generator (VFG) is illustrated in the disclosed embodiment, it should be understood that other generator systems such as an Integrated Drive Generator (IDG) will also benefit herefrom. These types of generators may be particularly well suited for aircraft applications The dynamoelectric portion 22 in the disclosed, non-limiting embodiment is a 3-phase machine that includes three machines 30, 32 and 34 mounted on a rotor shaft 36 along an axis of rotation A. Stator assemblies 30B, 32B, 34B of the three machines are installed in the housing assembly 28 and the three rotor assemblies 30A, 32A, 34A are installed on the rotor shaft 36. The housing assembly 28 may be closed with a drive end (DE) cover assembly 28A through which the rotor shaft 36 extends and a non-drive end (NDE) cover assembly 28B.

The first machine 30 includes a permanent magnet generator (PMG) with a PMG rotor assembly 30A and a stator assembly 30B. The PMG stator assembly 30B supplies power for generator excitation, as well as power for other components of the electrical system. The second machine 32 includes a Main Exciter (ME) with a ME rotor assembly 32A and a stator assembly 32B. The ME receives field excitation from the PMG through a GPCU (Generator Power Control Unit). The output of the ME rotor assembly 32A is supplied to a shaft mounted diode pack 38. The diode pack 38 may be divided into six diode groups to provide a 3-phase full wave bridge rectification. The DC output of the diode pack 38 supplies the third machine 34.

Figure 2:
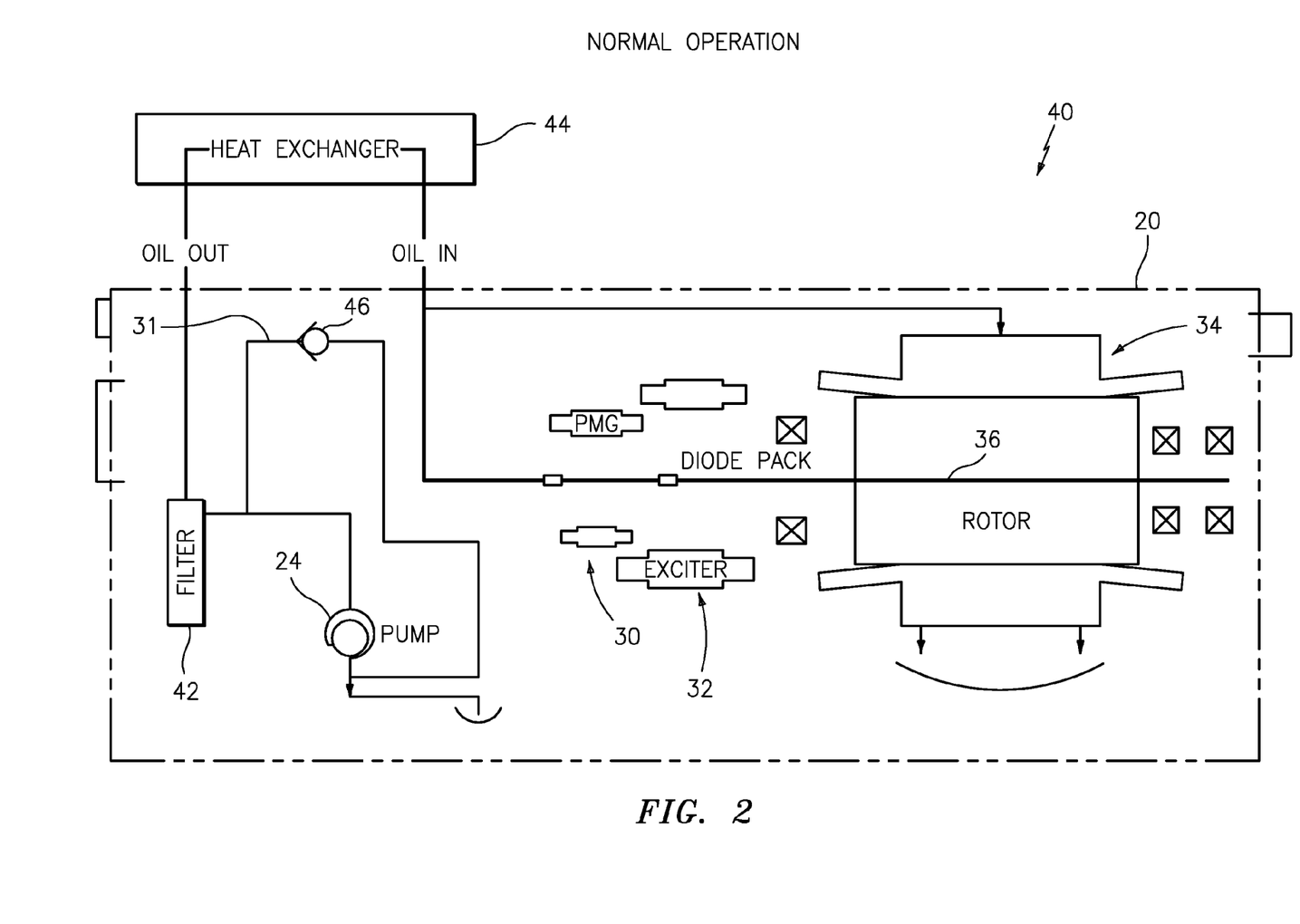
FIG. 2 is a schematic view of a an internal oil management system for the starter-generator under normal operation.

Referring to FIG. 2, the generator 20 includes an internal oil management system 40 that includes a pump 24. The oil collects in the generator sump/reservoir and is removed by the pump 24 within the housing assembly 28. The pump 24 supplies oil through an internal filter 42 to an external heat exchanger 44. The heat exchanger 44 then supplies the oil to the rotor shaft 36, which supplies oil to the internal components of the generator 20. Generally, oil though the center of the rotor shaft 36 cools the rotor/stator windings, the diodes, and lubricates the bearings. A bypass valve assembly 46 redirects oil in the event of a plugged filter 42 to prevent dead-heading of the pump 24 and allow the oil to heat up and trigger safety sensors such as a temperature warning or disconnect device.

Figure 3:
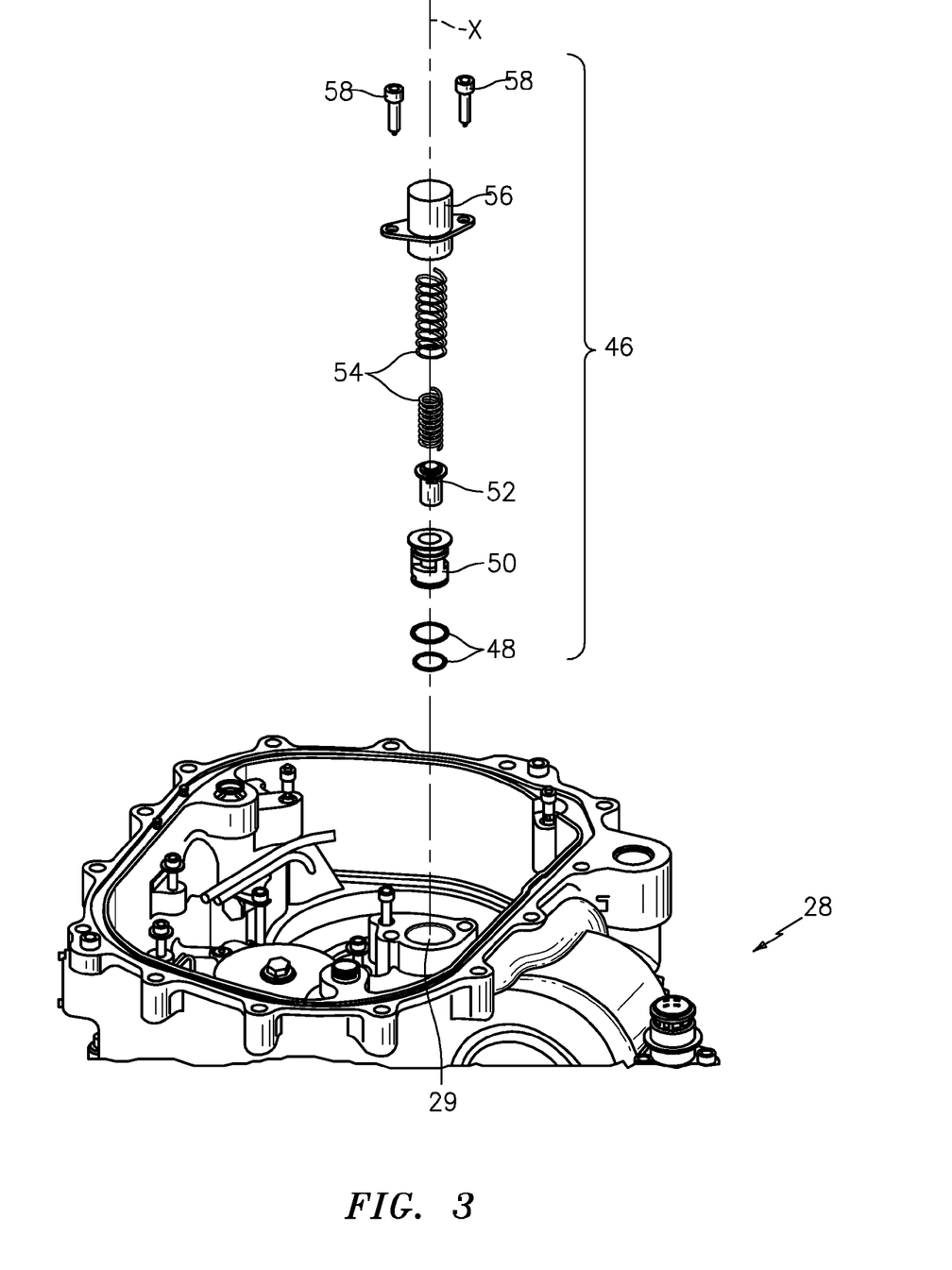
FIG. 3 is an exploded view of a bypass valve assembly for the generator.

Referring to FIG. 3, the bypass valve assembly 46 is mounted within the housing assembly 28. The bypass valve assembly 46 generally includes a set of O-rings 48, a valve sleeve 50, a piston 52, a nested spring arrangement 54, a spring cover 56 and a set of fasteners 58 to mount the bypass valve assembly 46 to the housing assembly 28. The valve sleeve 50 and the spring cover 56 are mounted at least partially within an opening 29 in the housing assembly 28. The opening 29 is in communication with a lubrication path 31 (FIG. 2) which is selectively opened by the bypass valve assembly 46 (FIG. 2). The lubrication path may be machined directly within the housing assembly 28. It should be understood that the housing opening 29 may be located in various housing portions within the housing assembly 28.

Figure 4:
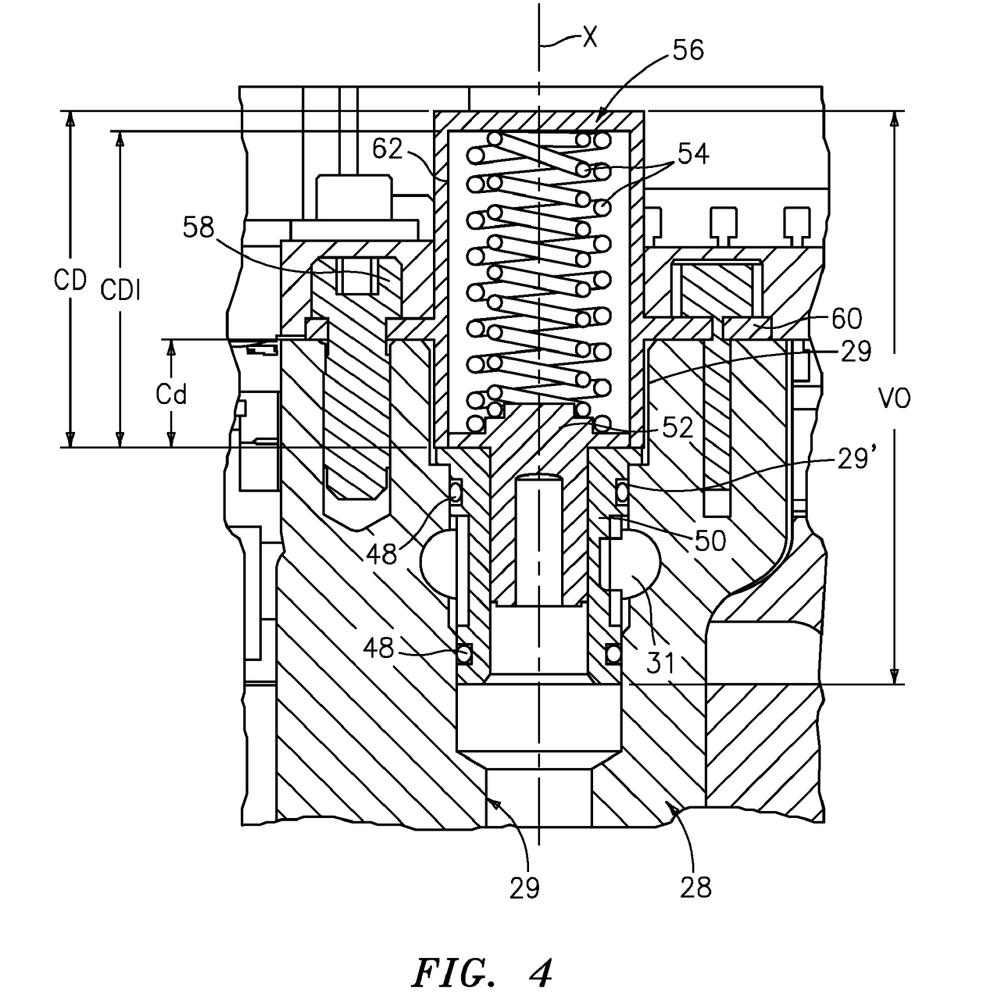
FIG. 4 is an sectional view of the bypass valve assembly.

Referring to FIG. 4, the piston 52 is fitted within the valve sleeve 50 for movement along an axis X. The sleeve 50 is retained within the housing opening 29 by the spring cover 56 which is mounted to the housing assembly 28 by fasteners 58. The set of O-rings 48 are supported on the valve sleeve 50 to provide a seal with the housing opening 29 and path 31. The piston 52 is movable relative the sleeve 50 along the axis X against the bias of the nested spring arrangement 54 (not shown in FIG. 4).

Figure 5A:
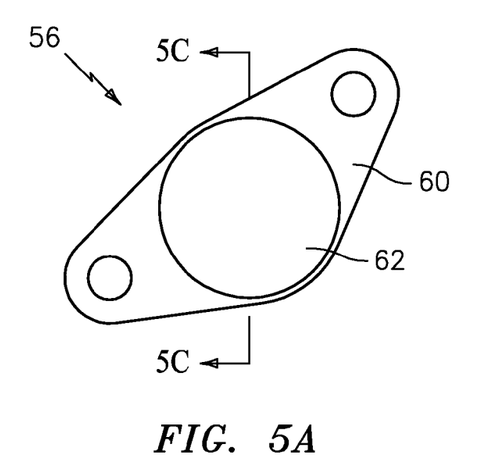
FIG. 5A is a top view of a spring cover of the bypass valve assembly.
Figure 5B:
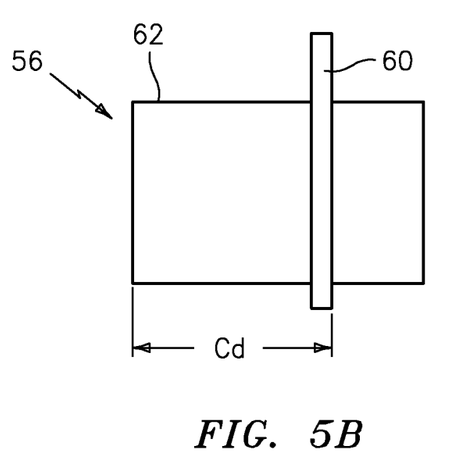
FIG. 5B is a side view of the spring cover of the bypass valve assembly.
Figure 5C:
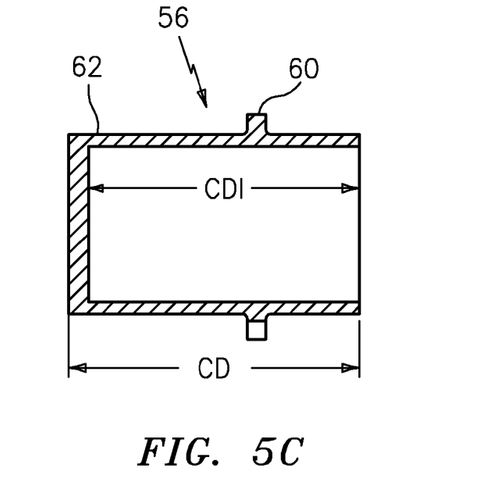
FIG. 5C is a longitudinal sectional view of the spring cover taken along line 5C-5C in FIG. 5A.

Referring to FIGS. 5A-5C, the spring cover 56 includes a spring cover body 62 and a spring cover flange 60 which extends radially therefrom. The flange 60 is located along the length of the spring cover body 62. The spring cover 56 defines an overall length dimension CD and an overall inner length dimension CDI with an end of cover to flange dimension Cd. In one non-limiting dimensional embodiment, dimension CD is approximately 1.38 inches (35.1 mm), dimension CDI is approximately 1.29 inches (32.6 mm), and dimension Cd is approximately 0.93 inches (23.6 mm). A particular ratio of dimension CD to Cd is between 1.6:1-1.2:1. The spring cover 56 relationship facilitates usage of a low spring rate nested spring arrangement 54 which results in low pressure variation from the cracking pressure to a full open position of the piston 52. One benefit is that the bypass valve assembly 46 disclosed herein reduces leakage by increasing the piston-to-window overlap P shown in FIG. 7. Such an overlap is significantly greater than conventional designs.

Referring to FIGS. 6A-6D, the valve sleeve 50 includes a valve sleeve body 64 and an integral valve sleeve flange 66. The valve sleeve 50 defines an overall length dimension SD with an end of sleeve to end of valve sleeve window opening dimension Sd. In one non-limiting dimensional embodiment, dimension SD is approximately 0.97 inches (25 mm) while dimension Sd is approximately 0.575 inches (14.6 mm). A particular ratio of dimension SD to Sd is between 1.9:1-1.5:1.

The valve sleeve 50 can be subjected to pressure pulsations from the pump that create cyclic loading. The valve sleeve 50 includes three valve sleeve windows 68 which are defined by a window longitudinal length SWL. In one non-limiting dimensional embodiment, SWL defines a length of 0.22 inches (5.6 mm). This valve sleeve window length and linear position defines the cracking and maximum (full open) pressure.

Each valve sleeve window 68 of the valve sleeve 50 has a significant corner radius Sr in each of four corners to improve flow area. In one non-limiting dimensional embodiment, the window corner radius Sr is R0.03. The large corner radius effectively eliminates failures caused by the sharp internal corners of typical conventional designs as the radiused internal corners minimize or prevent stress risers which may otherwise cause premature failures.

The overall flange outer diameter SFOD of the valve sleeve flange 66 is approximately 0.87 inches (22.1 mm). The overall outer diameter SOD of the valve sleeve 50 is approximately 0.75 inches (22.1 mm). The outer diameter SWOD of the valve sleeve 50 adjacent the valve sleeve windows 68 is approximately 0.625 inches (1.6 mm) this reduced diameter provides additional cross-sectional area to reduce pressure drop around the valve sleeve 50 when oil is bypassed. The overall flow cross section includes the flow path 31 shown in FIG. 4. A particular ratio of dimension SOD to SWOD is between 1.3:1-1.1:1.

Figure 6A:
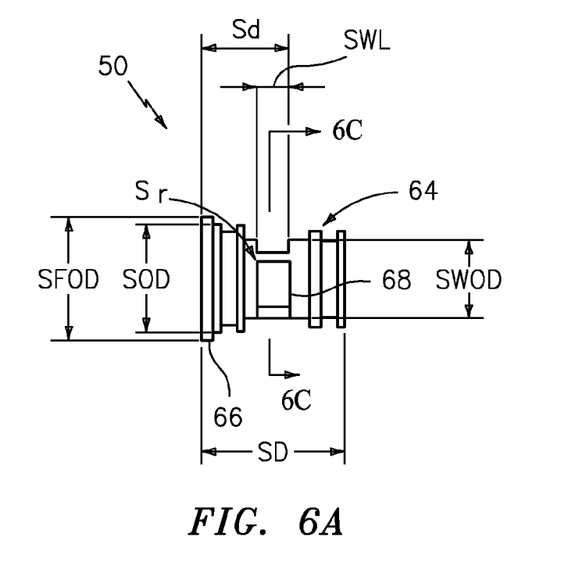
FIG. 6A is a side view of a valve sleeve of the bypass valve assembly.
Figure 6B:
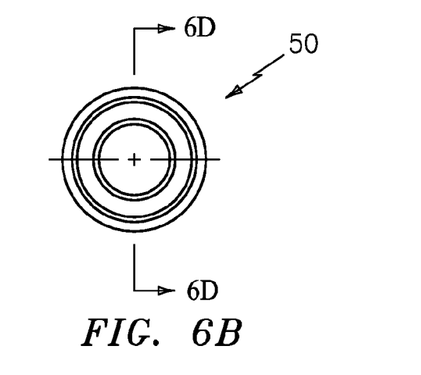
FIG. 6B is a top view of the valve sleeve of the bypass valve assembly.
Figure 6C:
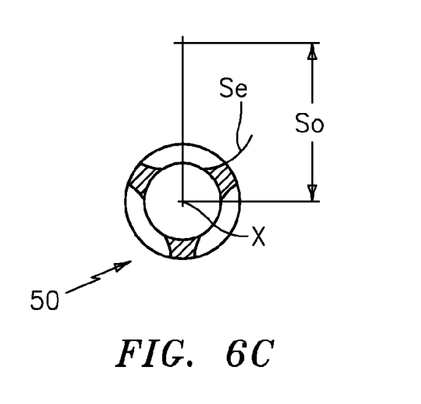
FIG. 6C is a sectional view of the valve sleeve taken along line 6C-6C in FIG. 6A.
Figure 6D:
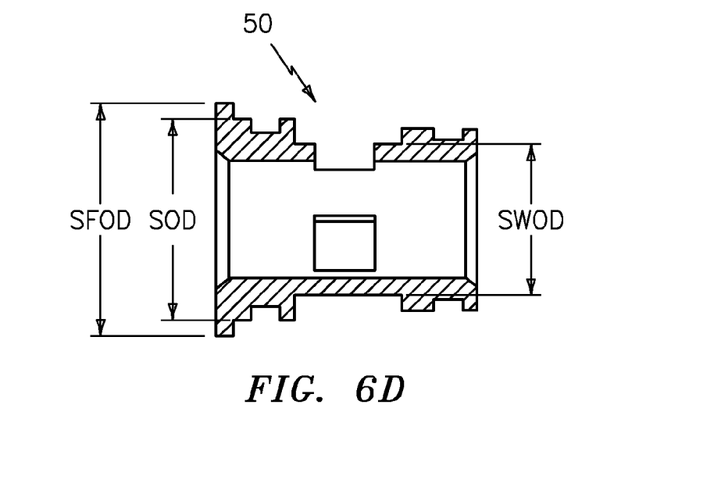
FIG. 6D is a sectional view of the valve sleeve taken along line 6D-6D in FIG. 6B.

Referring to FIG. 6C, in one non-limiting dimensional embodiment, the window longitudinal edge radius Se of 0.6 inches (15.2 mm) with a radius origin displaced SO 0.74 inches (18.8 mm) from axis X. The three valve sleeve window arrangement provides guidance for the piston 52 during opening/closing to limit tipping and possible impact loading on the edge created by the longitudinal edge radius Se.

Figure 7:
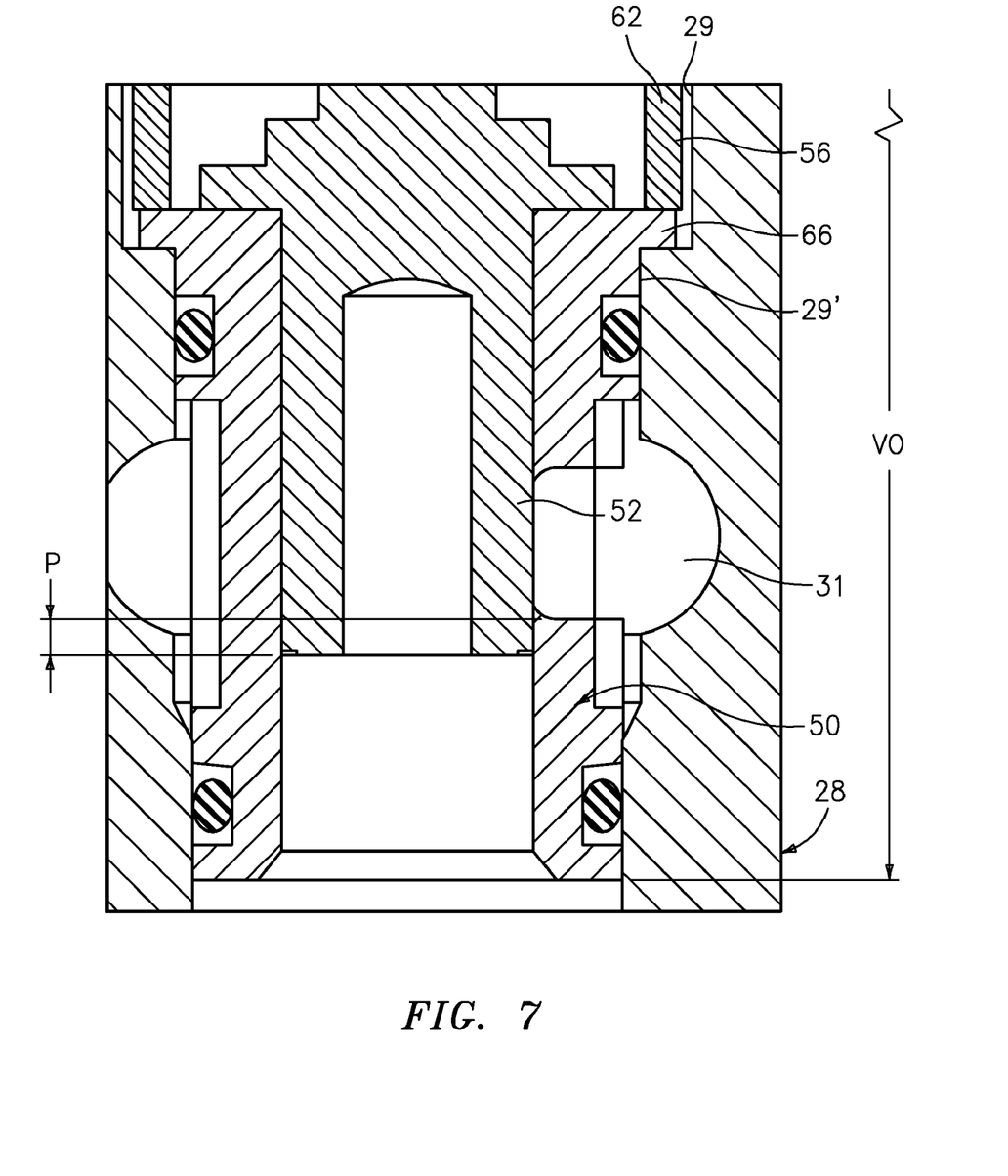
FIG. 7 is an expanded sectional view of the bypass valve assembly illustrating an overlap between piston and a valve sleep relative to an oil flow path.

Referring to FIG. 7, the valve sleeve body 50 is located within the housing opening 29 such that the valve sleeve flange 66 abuts a reduced diameter housing opening 29' such that the reduced diameter housing opening 29' operates as a stop for the valve sleeve 50 (FIG. 4). The spring cover body 62 is mounted at least partially within the housing opening 29 such that the spring cover body 62 abuts the valve sleeve flange 66. The spring cover flange 60 is attached to the housing assembly 28 with the set of fasteners 58 to thereby retain the valve sleeve 50 and the spring cover 56 in an assembled condition (FIG. 4). In one non-limiting dimensional embodiment, an overall valve sleeve and spring cover dimension VO is approximately 2.35 inches (60 mm) when in an assembled condition (FIG. 4).

The piston 52 is fitted within the valve sleeve 50 to define a piston overlap in which the piston 52 extends past the multiple of valve sleeve windows 68 within the valve sleeve 50 under normal operation to maintain a closed position. The piston 52 to valve sleeve window 68 overlap reduces leakage from the pressurized side of the bypass valve assembly 46 to the closed side during normal operation. In one non-limiting dimensional embodiment, the piston overlap is defined by a dimension P which provides a nominal overlap of 0.1 inches (2.5 mm). The valve sleeve 50 disclosed herein has less leakage than current designs and thereby facilities pump size reduction with concomitant weight and package size.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A spring cover comprising:
  a spring cover body having a flange which extends in a radial direction from said spring cover body, said spring cover body defines an overall length dimension and an end of spring cover body to flange dimension, said overall length dimension to said end of spring cover body to flange dimension defines a ratio between 1.6:1-1.2:1; and
  wherein said spring cover is configured to be at least partially mounted within an opening in a housing such that said flange is configured to abut an upper surface of said housing, and wherein, when said spring cover is at least partially mounted within said opening, a plane of said upper surface is generally perpendicular to an axis of said spring cover.

2. The spring cover as recited in claim 1, wherein said overall length dimension is approximately 1.38 inches (35.1 mm).

3. The spring cover as recited in claim 2, wherein said end of said spring cover body to said flange dimension is approximately 0.93 inches (23.6 mm).

4. A bypass valve assembly for a generator comprising:
a spring cover includes a flange which extends in a radial direction from a spring cover body, said spring cover body defines an overall length dimension, said overall length dimension to an end of said spring cover body to said flange dimension defines a ratio between 1.6:1-1.2:1;
wherein said spring cover is configured to be at least partially mounted within an opening in a housing such that said flange is configured to abut an upper surface of said housing, and wherein, when said spring cover is at least partially mounted within said opening, a plane of said upper surface is generally perpendicular to an axis of said spring cover; and
a valve sleeve adjacent to said spring cover, said valve sleeve defines a multiple of windows, each of said multiple of windows includes a longitudinal edge which defines a longitudinal edge radius.

5. The bypass valve assembly as recited in claim 4, wherein said valve sleeve defines an overall length dimension and an end of sleeve to end of valve sleeve window opening dimension, said overall length dimension and said end of sleeve to end of valve sleeve window opening dimension ratio is between 1.9:1-1.5:1.

6. The bypass valve assembly as recited in claim 4, wherein an origin of said longitudinal edge radius is located outside said valve sleeve body.

7. The bypass valve assembly as recited in claim 4, further comprising a piston movable relative said valve sleeve.

8. The bypass valve assembly as recited in claim 7, further comprising a nested spring arrangement engaged with said piston and said spring cover.

9. The bypass valve assembly as recited in claim 7, wherein said piston to said valve sleeve defines an overlap from a pressurized side to a closed side, said overlap defines a nominal overlap of approximately 0.1 inches (2.5 mm).

10. The bypass valve assembly as recited in claim 4, wherein said multiple of windows is no more, or less, than three windows.

11. The bypass valve assembly as recited in claim 10, wherein said multiple of windows are evenly distributed about an axis of said valve sleeve body.

12. The bypass valve assembly as recited in claim 4, wherein an origin of said longitudinal edge radius is located outside said valve sleeve body.

13. The bypass valve assembly as recited in claim 12, wherein said longitudinal edge radius is approximately 0.6 inches (15.2 mm) with said origin displaced approximately 0.74 inches (18.8 mm) from an axis of said valve sleeve.

14. A generator comprising:
a housing which defines an opening;
a spring cover includes a flange which extends in a radial direction from a spring cover body, said spring cover body defines an overall length dimension which extends at least partially within said opening, said overall length dimension to an end of said spring cover body to said flange dimension defines a ratio between 1.6:1-1.2:1;
a valve sleeve at least partially within said opening and adjacent to said spring cover, said valve sleeve defines a multiple of windows, each of said multiple of windows includes a longitudinal edge which defines a longitudinal edge radius;
wherein said spring cover is at least partially mounted within said opening;
wherein said housing includes an upper surface adjacent said opening, said flange abutting said upper surface; and
wherein said upper surface is generally planar, said plane of said upper surface extending generally perpendicular to an axis of said valve sleeve.

15. The generator as recited in claim 14, wherein each of said multiple of windows defines a corner radius in each of four corners.

16. The generator as recited in claim 14, wherein said valve sleeve defines an overall outer diameter and an outer diameter adjacent said multiple of valve sleeve windows, a ratio of said overall outer diameter to said outer diameter adjacent said multiple of windows is between 1.3:1-1.1:1.

17. The generator as recited in claim 14, wherein said valve sleeve defines an overall length dimension and an end of sleeve to end of valve sleeve window opening dimension, said overall length dimension and said end of sleeve to end of valve sleeve window opening dimension ratio is between 1.9:1-1.5:1.

18. The generator as recited in claim 14, wherein an origin of said longitudinal edge radius is located outside said valve sleeve body.

19. The generator as recited in claim 14, further comprising a piston movable relative to said valve sleeve, said piston define a piston overlap in which said piston extends past said multiple of windows to define a closed position.

20. The generator as recited in claim 19, wherein said piston overlap is approximately 0.1 inches.

* * * * *